United States Patent [19]

Rogers

[11] 4,146,670

[45] Mar. 27, 1979

[54] MANUFACTURE OF CERAMIC ARTICLES

[75] Inventor: Maurice G. Rogers, Birmingham, England

[73] Assignee: Foseco Trading A.G., Switzerland

[21] Appl. No.: 796,247

[22] Filed: May 12, 1977

[30] Foreign Application Priority Data

May 21, 1976 [GB] United Kingdom ............... 21098/76

[51] Int. Cl.$^2$ ........................ C04B 35/48; B05D 1/02; B32B 5/16; B32B 15/00
[52] U.S. Cl. ..................................... 428/328; 106/57; 106/299; 428/323; 428/331; 427/376 A; 427/190; 432/258
[58] Field of Search .................. 106/57, 69, 299, 308; 423/76, 78, 325, 326, 608; 428/332, 328, 323; 427/34, 37, 38, 39, 190, 376 A

[56] References Cited

U.S. PATENT DOCUMENTS

| 3,749,763 | 7/1973 | Scammon, Jr. et al. .............. 423/76 |
| 3,811,907 | 5/1974 | Scammon, Jr. et al. ........ 423/608 X |
| 3,892,579 | 7/1975 | Mabie, Jr. ........................... 106/57 X |
| 4,047,970 | 9/1977 | Morriss et al. ...................... 106/209 |

*Primary Examiner*—George F. Lesmes
*Assistant Examiner*—Daniel R. Zirker
*Attorney, Agent, or Firm*—Caesar, Rivise, Bernstein & Cohen, Ltd.

[57] ABSTRACT

This invention is concerned with improving the properties of refractory supports used in the manufacture of ceramic articles such as setters, batts, saggars, cranks, stilts, thimbles, saddles and spurs, and resides in the provision on an article-supporting surface of such supports of a coating comprising comminuted plasma dissociated zircon. Also provided is a method of coating refractory supports and a coating composition comprising a dispersion of comminuted plasma dissociated zircon in a carrier liquid.

10 Claims, No Drawings

MANUFACTURE OF CERAMIC ARTICLES

This invention relates to the manufacture of ceramic articles.

During manufacture ceramic articles are fired at high temperatures, for example, in a biscuit kiln or in a glost kiln, and during the firing operation it is necessary to provide a support for the articles, for example, refractory setters or batts. However, the use of supports can give rise to problems.

In the production of biscuit ware liquid phases formed during the firing of green ware can come into contact with the support where the surfaces of the ware and the support are touching, and this can result in the ware sticking to the support after the ware is fired and cooled.

Also, when biscuit ware is fired to produce glazed ceramic ware the glaze or frit which is applied to the ware melts to form a low viscosity liquid, which spreads over the surface of the biscuit ware, and which can flow between the ware and the refractory support on which the ware rests at the point of contact between the two. As a result the ware and the support adhere together, and after firing and cooling, the ware has to be broken away from the support. This can result in unsightly marks on the ware and also can produce a porous area on the ware which can become the site of absorbed stains when the ware is used. In addition excess glaze cannot be prevented from contaminating the refractory support, and as the glaze adheres strongly on solidification a layer of glaze builds up after a number of firing operations.

In order to minimise these problems it is common to make the supports from zircon or from a sandwich material such as silicon carbide having an outer layer of zircon. Alternatively the support is made from another refractory material and the support is then coated with zircon e.g. by application of a micronised zircon wash.

However, the use of zircon is not without disadvantages, since zircon is difficult to sinter at high temperatures, and while a binding phase for the zircon can be provided by the addition of an aluminosilicate material such as ball clay, the resulting zircon containing material is more readily wetted by molten glaze. In addition a zircon coating tends to remain relatively soft at kiln firing temperatures and can easily be abraded away so that the supports need to be recoated after a few firings.

Another problem is associated with the tendency of the refractory material forming the supports to spall at high temperatures. In the kiln the supports are often stacked one above the other, and particles of refractory material produced by spalling can fall on to glazed ware during firing from refractory supports above.

It has now been found that the incidence of the above problems can be substantially diminished by the use of comminuted plasma dissociated zircon as a coating material for a refractory support.

According to the invention there is provided a refractory support having on at least one article-supporting surface a coating comprising comminuted plasma dissociated zircon.

The refractory support of the invention may be any of those used during the manufacture of ceramic articles such as setters, batts, saggars, cranks, stilts, thimbles, saddles and spurs.

Plasma dissociated zircon consists of an intimate mixture of zirconia and silica in the form of monoclinic zirconia microcrystals in an amorphous silica glass and is produced by the treatment of zircon sand with a plasma torch. Equipment suitable for the production of plasma dissociated zircon is described in British Pat. Specification No. 1,248,595 and U.S. Pat. No. 3,708,409. Further data concerning this material is to be found in U.S. Pat. Nos. 3,749,753 and 3,811,907. In plasma dissociated zircon the ratio of zirconia to silica is virtually the same as in the original zircon from which the plasma dissociated zircon is formed. When plasma dissociated zircon is fired at a temperature in excess of 1100° C. the zirconia and silica recombine to form zircon.

The plasma dissociated zircon may be comminuted to a suitable particle size, e.g. less than 0.053 mm, by dry milling.

The comminuted plasma dissociated zircon may be applied to the article-supporting surface as a dispersion in a carrier liquid such as water by any suitable means such as spraying, brushing or dipping.

Although the support may be used after drying to remove carrier liquid, it is preferred to fire the support, preferably at a temperature in excess of 1250° C., before use. Moreover, it is preferred to fire the support in an oxidising atmosphere, since in an atmosphere containing reducing gases, $Fe_2O_3$ present in the base may be reduced and allow migration of iron compounds to the surface, with concomitant break-up of the coating of plasma dissociated zircon.

If desired a binder may be incorporated in the dispersion of comminuted plasma dissociated zircon in a carrier liquid in order to provide a bond for the coating prior to firing of the support. Examples of suitable binders include natural or synthetic resins e.g. a phenol-formaldehyde resin, or other polymeric binders such as cellulose ethers, polyacrylamides, polyvinyl alcohols and polyethylene glycols.

It may also be desirable to incorporate a suspension agent in the dispersion to maintain the comminuted plasma dissociated zircon in suspension in the carrier liquid or to re-suspend the comminuted plasma dissociated zircon when the dispersion has been allowed to stand, although some binders will also act as suspension agents.

The dispersion may be prepared by mixing the comminuted plasma dissociated zircon with the carrier liquid or with a solution of a binder and/or suspension agent in the carrier liquid using, for example, a pigment dispersion mill or a mixing machine fitted with a rotating mixing head.

A coating thickness on the article-supporting surface of from 0.1 to 1.0 mm is usually sufficient.

When ware is placed on a support according to the invention and fired, the incidence of ware adhering to the support, either as a result of liquid phase from green ware adhering to the support at the point of contact between the two, or of glaze from biscuit ware penetrating between the ware and the support, is greatly diminished. The tendency of particles of refractory material to spall away from the underside of a support and contaminate glazed ware placed below the support in a kiln is also greatly reduced.

The invention includes a composition for use in coating refractory supports used in the manufacture of ceramic articles, which composition comprises a dispersion of comminuted plasma dissociated zircon in a carrier liquid.

The invention also includes a method of preparing a refractory support for use in the manufacture of ceramic articles, which method comprises coating at least one article-supporting surface of the refractory support by applying thereto a composition as defined above and drying the coating.

The following examples will serve to illustrate the invention:

EXAMPLE 1

Comminuted plasma dissociated zircon of mean particle size 7.5 microns was mixed with water to form a dispersion of density 2.30 g/cm$^3$ (corresponding to a solids content of approximately 75% by weight).

The dispersion was painted by hand on to the damp article-supporting surface of clean fireclay batts to give a coating approximately 0.1 mm thick. The batts were then dried for 2 hours at 110° C. and fired for 1 hour in an electric furnace at 1280° C.

After firing a smooth, white, well-bonded ceramic coating was obtained.

The coated batts were used as supports for cups fired in a glost kiln, and the coating was found to significantly lower the incidence of bonding of the cups to the supports by excess glaze. When no coating of plasma dissociated zircon was used 130 cups of a total of 1000 cups were defective, whereas using supports according to the invention only 2 cups out of a total of 1000 cups were defective. There was no evidence of spalling of the coated batts causing particles to fall on to and contaminate the glazed cups.

EXAMPLE 2

A 20% by weight aqueous solution of a polyacrylamide of molecular weight 10000 was diluted with water at a rate of 15 parts by volume of polyacrylamide solution to 85 parts by volume of water.

75 parts by weight of plasma dissociated zircon of mean particle size 8.5 microns were mixed with 25 parts by weight of the diluted polyacrylamide solution, and the mixture was milled in a pigment dispersion mill for 24 hours to give a dispersion having a density of approximately 2.2 g/cm$^3$.

The dispersion was sprayed on to the article-supporting surface of dry fireclay batts to give a coating thickness of 0.1–0.4 mm. The batts were dried in an oven for ½ hour at 80° C. and a tough, hard coating was obtained. The batts were then fired in an oxidising atmosphere for 1 hour at 1280° C. The organic binder was burned off and the batts had a white, hard and coherent surface.

The batts were positioned in a biscuit kiln, and green ware to be fired was placed directly on to the batts. The ware was then fired.

It was found that the ware suffered no constriction in its normal firing shrinkage, and did not become bonded to the batts.

I claim:

1. In a refractory support for use in glazing a ceramic article in a kiln, said refractory support having at least one article supporting surface, the improvement comprising providing said refractory support surface with a coating comprising comminuted plasma-dissociated zircon, said refractory support surface being suitable for supporting an article which has been coated with glaze and then fired while supported on the refractory support surface whereby excess glaze flowing from said article to said surface will not adhere strongly to the support such that said article after firing can be readily separated from said support and from excess glaze whereby said article is free of excess glaze which may remain on said support, such that the glazed article may be cleanly removed from the support.

2. A refractory support according to claim 1, wherein the comminuted plasma-dissociated zircon has a particle size of less than 0.053 mm.

3. A refractory support according to claim 1 wherein the coating thickness on the article-supporting surface is from 0.1 to 1.0 mm.

4. A refractory support according to claim 1 wherein the coating has been fired to a temperature of at least 1250° C.

5. A method of preparing a refractory support for use in the manufacture of glazed ceramic articles in a kiln, which method comprises applying to said refractory support surface a coating comprising comminuted plasma-dissociated zircon, said refractory support surface being suitable for supporting an article which has been coated with glaze and then fired while supported on the refractory support surface whereby excess glaze flowing from said article to said surface will not adhere strongly to the support such that said article after firing can be readily separated from said support and from excess glaze whereby said article is free of excess glaze which may remain on said support, such that the glazed article may be cleanly removed from the support.

6. A method according to claim 5, wherein the coating is applied by a coating technique selected from spraying, brushing and dipping.

7. A method according to claim 5, wherein the support is fired after the coating is applied and before use.

8. A method according to claim 7, wherein the firing is at a temperature of at least 1250° C.

9. A method according to claim 7, wherein the firing is effected in an oxidizing atmosphere.

10. A method according to claim 20, wherein the coating is applied to a thickness of from 0.1 to 1.0 mm.

* * * * *